United States Patent [19]

Arisawa et al.

[11] Patent Number: 4,574,309
[45] Date of Patent: Mar. 4, 1986

[54] SOLID STATE IMAGE PICK-UP DEVICE

[75] Inventors: Yasuo Arisawa, Matsumoto; Yoshimasa Kusazaki, Nagano; Hidetoshi Yamada, Tokyo; Akira Watanabe, Fuchu; Yutaka Yunoki, Kunitachi, all of Japan

[73] Assignee: Olympus Optical Co., Ltd., Tokyo, Japan

[21] Appl. No.: 528,033

[22] Filed: Aug. 31, 1983

[30] Foreign Application Priority Data

Sep. 9, 1982 [JP] Japan .................. 57-157289

[51] Int. Cl.[4] .......................... H04N 3/12; H04N 5/14
[52] U.S. Cl. .................................... 358/212; 358/166
[58] Field of Search ............... 358/162, 166, 213, 212, 358/209, 169; 354/24 LR

[56] References Cited

U.S. PATENT DOCUMENTS

| 3,340,356 | 9/1967 | James ................................. 358/166 |
| 4,010,319 | 3/1977 | Levine ................................ 358/213 |
| 4,335,405 | 6/1982 | Sakane et al. ..................... 358/213 |

Primary Examiner—Thomas W. Brown
Assistant Examiner—Stephen Brinich
Attorney, Agent, or Firm—Parkhurst & Oliff

[57] ABSTRACT

A solid state image pick-up device includes a number of picture elements arranged in a matrix form. Each picture element being constituted by a MOS transistor and a photodiode, gates of the MOS transistors arranged in the vertical direction are connected to respective horizontal scanning lines which are connected to outputs of a horizontal shift register. Drains of the MOS transistors arranged in a horizontal direction are connected to respective vertical scanning lines both ends of which are connected to first and second signal read-out lines via first and second vertical selection switches, respectively. In the case of effecting a shutter speed control, the first and second vertical shift registers produce first and second vertical scanning pulses which are shifted by a given time period corresponding to a desired shutter open time to scan each picture element twice during each frame period. In the case of effecting a vertical contour enhancement, the shutter speed is fixed to a field period and vertically adjacent picture elements are scanned simultaneously and image signals simultaneously derived on the first and second signal read-out lines are supplied to a differential amplifier to derive a difference therebetween which is then added to the image signal on the first signal read-out line.

13 Claims, 38 Drawing Figures

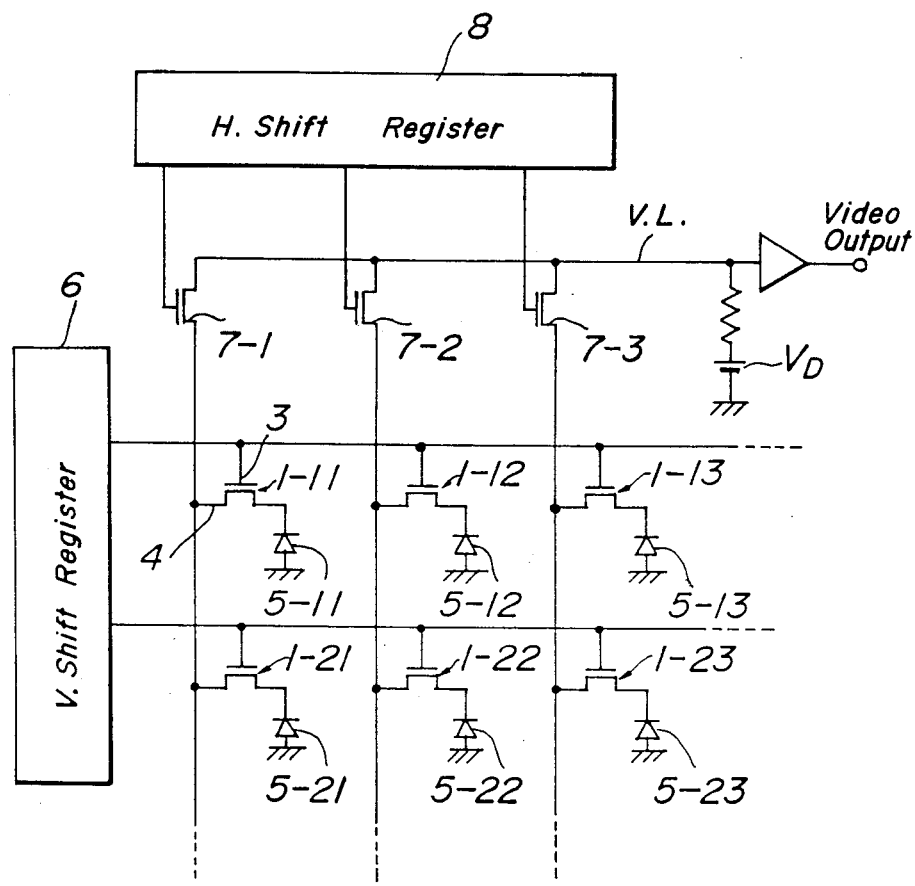
FIG_1A
PRIOR ART
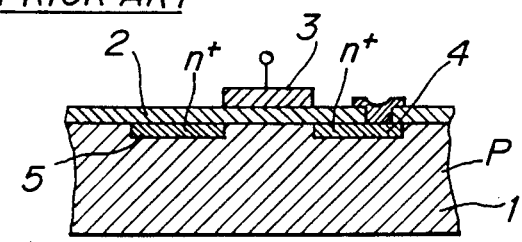
FIG_1B
PRIOR ART

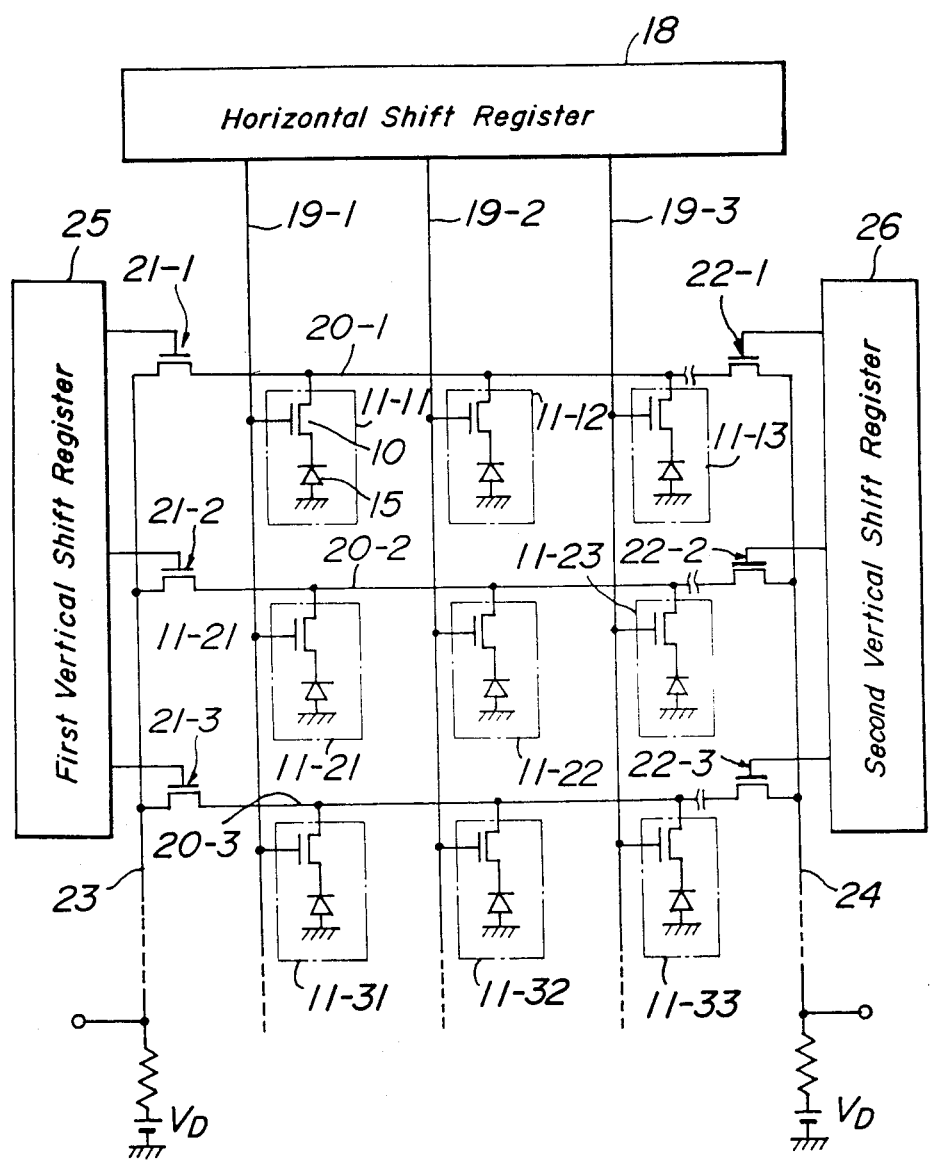
FIG_2

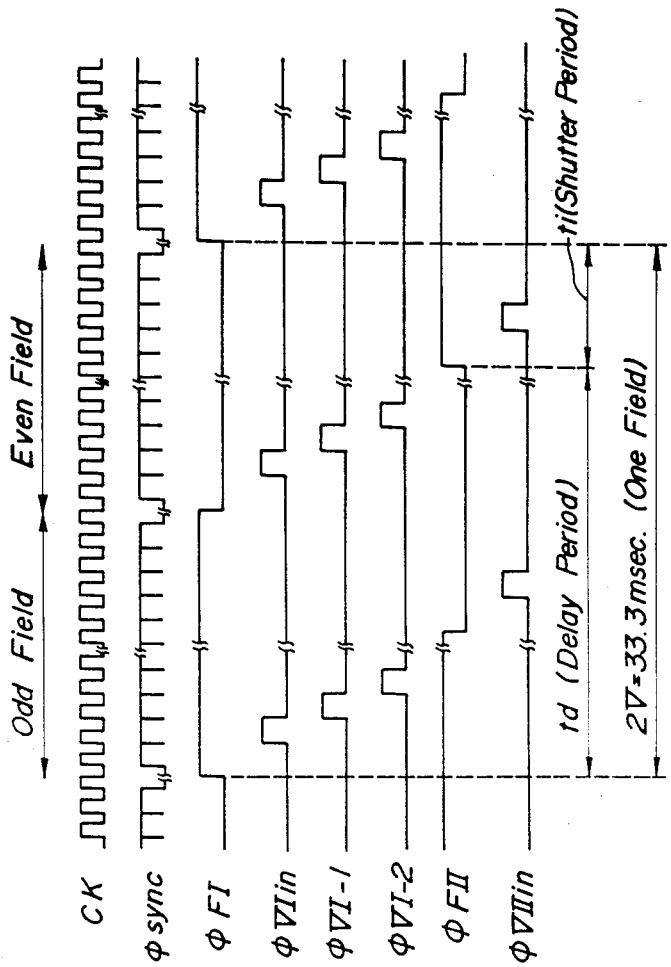

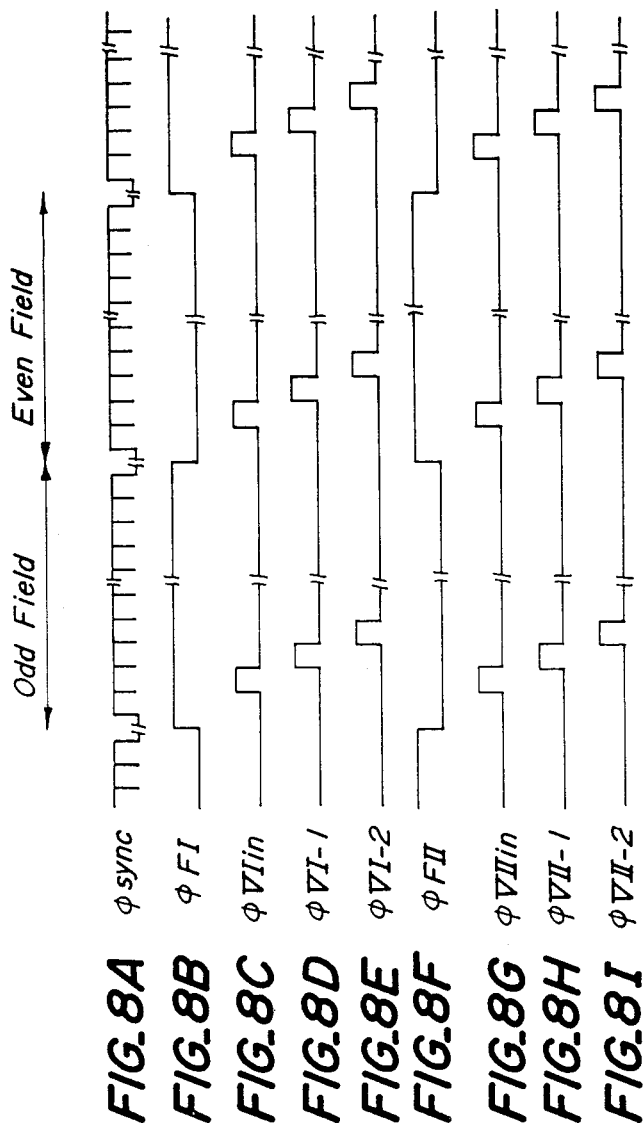

SOLID STATE IMAGE PICK-UP DEVICE

BACKGROUND OF THE INVENTION

The present invention relates to a solid state image pick-up device in which either a shutter function or a contour enhancing function can be selected at will.

In a conventional method for improving the quality of a television image, there has been proposed a method for effecting the contour enhancement of the image. According to the known method, the contour enhancement in a horizontal direction in parallel with the scanning line can be achieved by a relatively simple circuit construction. However, in order to perform the contour enhancement in a vertical direction, it is necessary to use an expensive and large device such as a precise delay line and a mass-storage memory.

In the known solid state image pick-up device, in order to emphasize the contour of the image in the vertical direction, it is necessary to calculate the difference between image signals derived from adjacent scanning lines. In the known solid state image pick-up device, since it is impossible to simultaneously obtain adjacent plural scanning lines, use may be made of a delay line having a delay time corresponding to one horizontal scan period. Since the delay line requires a high precision, it is very expensive. Moreover, since, in the case of performing the interlace scanning operation, the signal obtained by the delaying operation for one horizontal scanning period is the image signal belonging to the same field, the signals thus obtained are not from adjacent scanning lines, but from every other line. Therefore, the thus obtained contour signals in the vertical direction include a lot of low frequency components and thus sufficient contour enhancement cannot be achieved.

In order to obtain the adjacent scanning line signals the case of effecting the interlace scanning operation, there is a method for storing the image signals of one field in a field memory. In this case, the contour signals can be obtained over a high frequency range. However, since the field memory requires an extremely large mass storage, the entire pick-up device is liable to be more expensive and larger.

The solid state image pick-up device of the kind mentioned above operates under the so-called XY address system and has an electronic shutter function. Such a solid state image pick-up device can be manufactured by utilizing the well-developed MOS-IC technique and has been generally applied to small size video cameras.

FIGS. 1A and 1B illustrate an example of a known solid state image pick-up device. FIG. 1A shows schematically the whole construction of the device and FIG. 1B is a cross section depicting the construction of a single picture element. The image pick-up device comprises a number of picture elements 1-11, 1-12 . . . ; 1-21, 1-22 . . . ; . . . arranged in a matrix form and formed in a p-type semiconductor substrate 1. Each of the picture elements comprises a MOS transistor having a source 2 and a drain 4 formed in a main surface of the substrate 1 and a gate 3 formed on an insulating layer applied on the main surface, and a n+p photodiode 5 constituted by a junction between the p-type substrate 1 and n+ source 2. In the source 2 is stored a signal charge whose amount corresponds to the incident light amount. To the gates 3 of the MOS transistors are applied vertical scanning pulses from a vertical shift register 6, while to the drains 4 of MOS transistors are connected to horizontal selection switches 7-1, 7-2, . . . comprising MOS transistors and horizontal scanning pulses are applied to the switches from a horizontal shift register 8 so as to connect selectively the drains 4 of the MOS transistors to a video output line V.L. The horizontal scanning pulse has a frequency $f_H$ of 15.75 KHz and the vertical scanning pulse has a frequency fv of 30 Hz.

When the vertical scanning pulse is applied to the gate 3 of the MOS transistor constituting a picture element and, at the same time, the drain 4 of the related MOS transistor is selected by a horizontal selection switch 7 driven by the horizontal scanning pulse, the signal charge stored in the photodiode 5 is read-out onto the video output line V.L. At the same time, the photodiode 5 is reverse-biased or reset by a supply source $V_D$, so that the charge storing operation is started again.

In the known solid state image pick-up device explained above, the reading out operation and the reset operation are effected simultaneously, the charge storing period, i.e. the exposure time corresponding to a shutter open time is fixed to 1/fv=33.3 m sec. and cannot be made shorter than 1/fv.

In general, in the case of picking-up a moving object, it is necessary to shorten the shutter open time in order to obtain a sharp image of the object. However, in the known pick-up device, since the shutter open time is fixed, when the moving object is picked-up, the image sharpness is decreased and the image quality is greatly deteriorated. In order to obviate such a drawback, it has been proposed to provide a high speed rotary shutter in a video camera or to ignite a stroboscopic lamp during a vertical blanking period. However, such a solution requires special device, so that the camera is liable to be complicated in construction, large in size, heavy in weight and expensive in cost, and further usage of such a camera is limited in various ways.

As explained above, in order to improve the quality of the image reproduced by the image signal derived from the solid state image pick-up device, it is preferable to effect the vertical enhancement and the electronic shutter speed control. However, in practice, it is very difficult to carry out both of the above measures simultaneously. The inventors have recognized the fact that the image quality can be improved considerably, even by effecting either of the two measures depending upon the object to be picked-up. For instance, if an object is moving at a high speed, it is preferable to shorten the shutter open time, but if an object that is standing still is picked-up, the image quality can be improved materially by effecting the vertical enhancement, while the shutter speed is fixed to one field period. Therefore, a solid state image pick-up device in which either the vertical enhancement or the shutter speed control can be selectively effected is required.

SUMMARY OF THE INVENTION

The present invention has for its object to eliminate the drawbacks mentioned above and to provide a solid state image pick-up device in which either the contour signal enhancement in the vertical direction or the shutter speed control can be selectively effected at will.

It is another object of the invention to provide a solid state image pick-up device, in which a contour signal enhancement in the vertical direction can be effected without any additional memory means or delay means.

It is still another object of the invention to provide a solid state image pick-up device, in which a very precise vertical enhancement can be carried out even in the case of interlace scanning.

It is still another object of the invention to provide a solid state image pick-up device, in which a signal charge storing time, i.e. a shutter open time, can be simply adjusted externally at will.

According to the invention, a solid state image pick-up device comprises:

means having a number of picture elements arranged in a matrix form, each picture element including at least one MOS transistor and a photodiode;

horizontal scanning means connected to said picture elements for scanning horizontally the picture elements at a given horizontal scanning period;

vertical scanning means connected to said picture elements for scanning the picture elements at a given vertical scanning period;

signal reading-out means including first and second signal read-out lines selectively connected to the picture elements under the control of said horizontal and vertical scanning means in such a manner that signal charges stored in the photodiodes are read-out twice within a frame period to perform a shutter function having a variable shutter open time;

contour enhancing means for enhancing a contour of an image in the vertical direction by reading-out signal charges stored in two vertically adjacent photodiodes simultaneously, while said shutter open time is fixed to the frame period, to effect a contour enhancement function; and selection means for selecting one of said shutter function or contour enhancement function at will.

BRIEF DESCRIPTION OF THE DRAWINGS

FIG. 1A is a block diagram showing a circuit construction of a conventional MOS type image pick-up device;

FIG. 1B is a cross sectional view illustrating a unit pixel construction of the device shown in FIG. 1A;

FIG. 2 is a block diagram showing a circuit construction of an embodiment of the solid state image pick-up device according to the invention;

FIGS. 7A to 7H are timing charts for explaining the operation of the device shown in the FIG. 6 in case when the shutter function is effected; and FIGS. 8A to 8I are timing charts for explaining the operation of the device shown in the FIG. 6 in case when the contour enhancement function is effected.

DESCRIPTION OF THE PREFERRED EMBODIMENTS

FIG. 2 is a circuit diagram showing an embodiment of the solid state image pick-up device according to the invention. In the present embodiment, interlace scanning is not effected. The device comprises a number of picture elements 11-11, 11-12, 11-13 . . . ; 11-21, 11-22, 11-23 . . . ; 11-31, 11-32, 11-33 . . . ; . . . arranged in a matrix form. Each picture element comprises a MOS transistor 10 and a photodiode 15 formed at the source of the MOS transistor. Gates of MOS transistors arranged in the Y direction (vertical direction) are commonly connected to respective horizontal scanning lines 19-1, 19-2, 19-3 . . . and drains of MOS transistors arranged in the X direction (horizontal direction) are commonly connected to respective vertical scanning lines 20-1, 20-2, 20-3 . . . . The horizontal scanning lines 19-1, 19-2, 19-3 . . . are connected to outputs of the horizontal shift register 18 and both ends of the vertical scanning lines 20-1, 20-2, 20-3 . . . are connected to first and second signal read-out lines 23 and 24, respectively through first vertical selection switches 21-1, 21-2, 21-3 . . . and second vertical selection switches 22-1, 22-2, 22-3 . . . , respectively. Each of the first and second vertical selection switches is formed by a MOS transistor. In the solid state image pick-up device there are further provided first and second vertical shift registers 25 and 26 whose outputs are connected to gates of the first and second vertical selection switches 21-1, 21-2, 21-3 . . . and 22-1, 22-2, 22-3 . . . , respectively.

According to the invention either the vertical enhancement or the shutter speed control can be selectively effected at will. To this end, the solid state image pick-up device shown in FIG. 2 is further incorporated with the control circuitry shown in FIG. 3.

Figure 3:
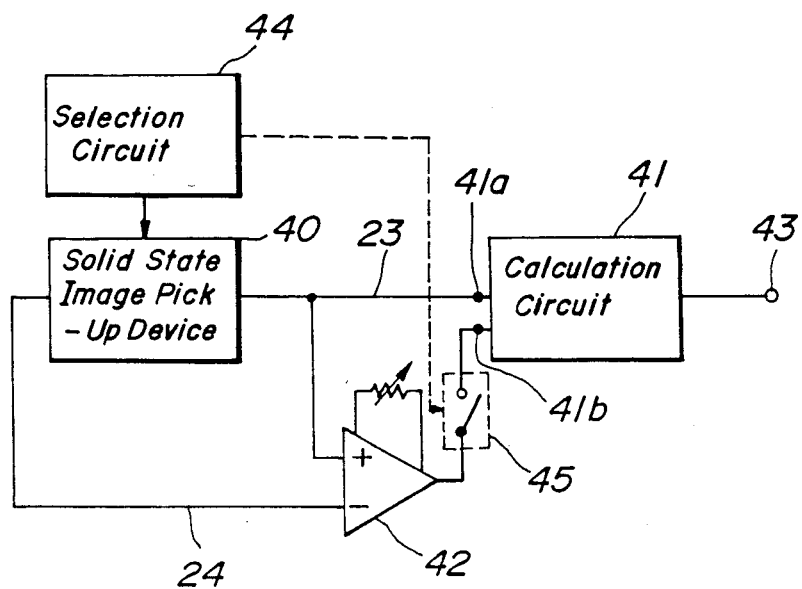
FIG. 3 is a block diagram depicting a circuit construction for performing selectively a contour enhancement function and a shutter function according to the invention.

In FIG. 3, the solid state image pick-up device generally denoted by the reference numeral 40 is connected to a first input terminal 41a of a calculation circuit 41 through the first signal read-out line 23, and also a first input terminal of a differential amplifier 42 is connected to a junction point between the solid state image pick-up device 40 and the first signal read-out line 23. Further, the image pick-up device 40 is connected to a second input terminal of the differential amplifier 42 through a second signal read-out line 24. Moreover, an output of the differential amplifier 42 is connected to a second input terminal 41b of the calculation circuit 41 through a switch 45 which is controlled by a selection circuit 44. When the switch 45 is placed on by the selection circuit 44, the contour enhancement function in the vertical direction can be performed. Contrary to this, when the switch 45 is placed off, only the shutter control function can be effected. Further, an output signal generated from the calculation circuit 41 is supplied to an output line 43 as the output image signal.

In the present embodiment, in the case of performing the contour enhancement function, the differential amplifier 42 detects a difference between image signals supplied from the solid state image pick-up device 40 through the first and second signal read-out lines 23 and 24 simultaneously. Then, the difference signal thus detected is amplified at a given rate and is supplied to the second input terminal 41b of the calculation circuit 41. In the calculation circuit 41, the output signal of the differential amplifier 42 is added to the image signal supplied from the solid state image pick-up device 40 through the first signal read-out line 23, and the sum signal thus obtained is supplied to the output line 43. In this manner, an output signal wherein the contour of the image is enhanced in the vertical direction can be obtained.

Moreover, in case of performing the shutter control function, the image signal generated from the solid state image pick-up device 40 is directly supplied to the output line 43 through the first read-out line 23 and the calculation circuit 41.

Now the operation of the solid state image pick-up device shown in FIGS. 2 and 3 will be explained with reference to timing charts illustrated in FIGS. 4A to 4H and 5A to 5H, respectively representing the shutter operation and the contour enhancement operation. In this embodiment, it should be noted that one field period is equal to one frame period.

Figure 4:
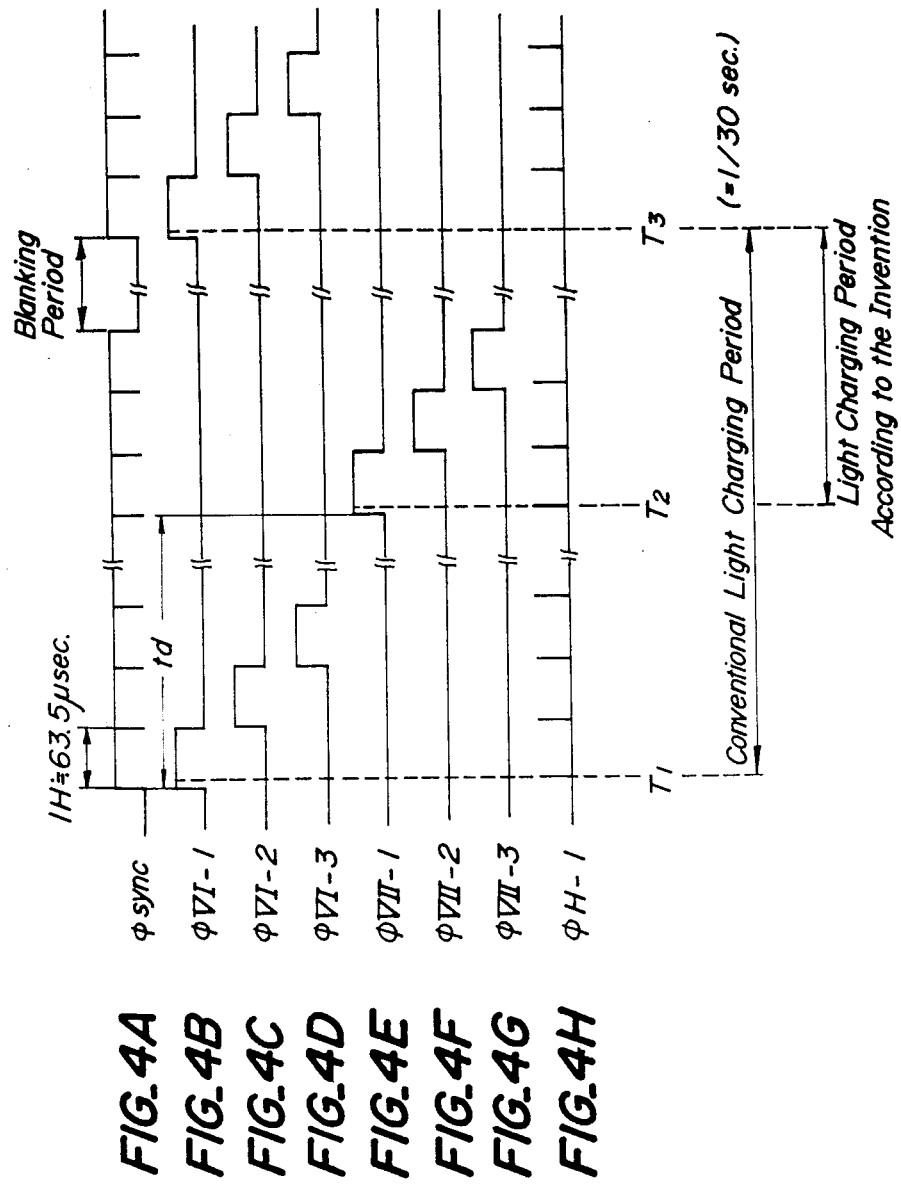
FIGS. 4A to 4H are timing charts for explaining the operation of the device shown in the FIG. 2 in case when the shutter function is effected.
Figure 5:
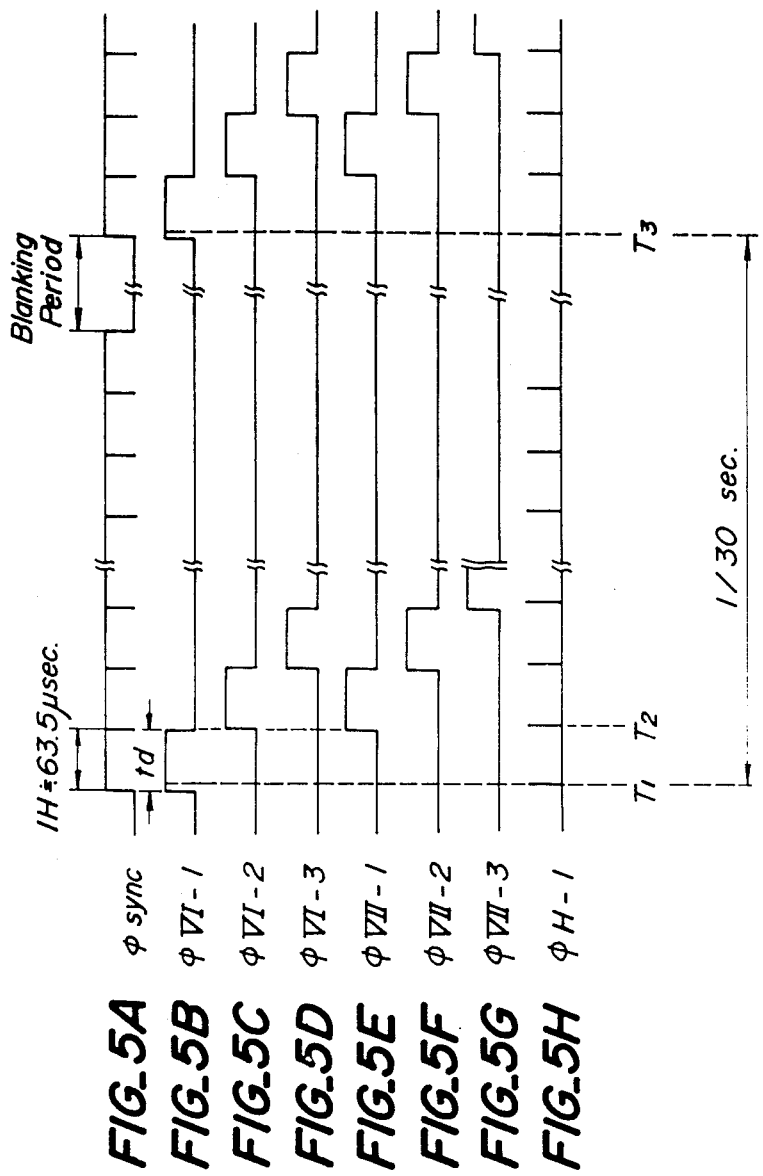
FIGS. 5A to 5H are timing charts for explaining the operation of the device shown in the FIG. 3 in case when the vertical contour enhancement function is effected.

The shutter speed control will be first explained. FIG. 4A shows a vertical synchronizing signal $\phi$sync, FIGS. 4B to 4D show first vertical scanning pulses $\phi$VI supplied from the first vertical shift register 25, and FIGS. 4E to 4G illustrate second vertical scanning pulses $\phi$VII generated from the second vertical shift register 26. In the drawing, only the vertical scanning pulses for the first three lines are shown and suffixes applied thereto denote line numbers. FIGS. 4H and 5H represent horizontal scanning pulses $\phi$H supplied from the horizontal shift register 18. In FIGS. 4H and 5H, show the horizontal scanning pulses for a first line only.

Now the operation of a single picture element, e.g. the picture element 11-11 in the case of effecting the shutter function will be considered. At a time $T_1$, the first vertical selection switch 21-1 is turned on by the first vertical scanning pulse $\phi$VI-1. Then the MOS transistor 10 constituting the relevant picture element 11-11 is turned on by the horizontal scanning pulse $\phi$H-1 and therefore, the relevant photodiode 15 is reverse-biased, so that the storing operation of the signal charge is initiated. At a time $T_2$, the second vertical selection switch 22-1 is turned on by the second vertical scanning pulse $\phi$VII-1 and the relevant MOS transistor 10 is turned on again by the horizontal scanning pulse $\phi$H-1. Then the signal charge stored in the photodiode 15 flows into the second signal read-out line 24 and the photodiode is reverse-biased again to restart the storing operation. At a time $T_3$, the first vertical selection switch 21-1 is turned on by the first horizontal scanning pulse $\phi$VI-1 and the relevant MOS transistor 10 is also turned on by the horizontal scanning pulse $\phi$H-1. Then, the signal charge stored in the relevant photodiode 15 during a time period $T_3$-$T_2$ is read-out onto the first signal read-out line 23 and after that the photodiode 15 is reverse-biased again.

As can be understood from the above explanation, in the solid state image pick-up device according to the invention, since the signal charge stored in the photodiode 15 during time period $T_2$-$T_1$ can flow onto the second read-out line 24 at the time $T_2$, the time period during which the signal charge is stored in the photodiode 15 can be reduced to ($T_3$-$T_2$), and the signal charge is read-out of the photodiode onto the first signal read-out line 23 to produce an output image signal. In the known solid state image pick-up device the signal charge storing period is fixed to $T_3$-$T_1$=33.3 m sec. Contrary to this, according to the invention, the signal charge storing period $T_3$-$T_2$ can be set at will by changing the delay time $t_d$ of the second vertical scanning pulse $\phi$VII with respect to the first vertical scanning pulse $\phi$VI. According to the invention, the delay time $t_d$ can be adjusted by an integer multiple of the horizontal scanning period H=63.5 $\mu$sec. and thus, the signal charge storing period i.e. the shutter open time can be adjusted within a very wide range from 63.5 $\mu$sec. to 33.3 m sec.

As explained above, in the solid state image pick-up device each picture element is read-out twice during the field period. This property can be advantageously utilized to effect the vertical enhancement. Now, the operation of the vertical enhancement will be explained in detail with reference to the time charts shown in FIGS. 5A to 5H corresponding to FIGS. 4A to 4H, respectively.

In the case of effecting the contour enhancement function, since it is necessary to use the adjacent two lines simultaneously, two adjacent horizontal scanning pulses $\phi$VI-2 and $\phi$VII-1; $\phi$VI-3 and $\phi$VII-2; . . . are generated at the same time and the image signals of the adjacent lines are generated simultaneously on the first and second signal read-out lines 23 and 24. Therefore, the differential calculation between two adjacent lines for the contour enhancement can be performed within one field period. In this case, the charge storing period for the image signal read-out on the line 23 is fixedly determined to ($T_3$-$T_2$) (i.e. td=H), and the charge storing period for the image signal read-out on the line 24 is equal to 1H. However, this charging period difference can be corrected by changing a gain therebetween, if necessary. In this case, a signal amplifier may be arranged in the second signal read-out line 24.

Figure 6:
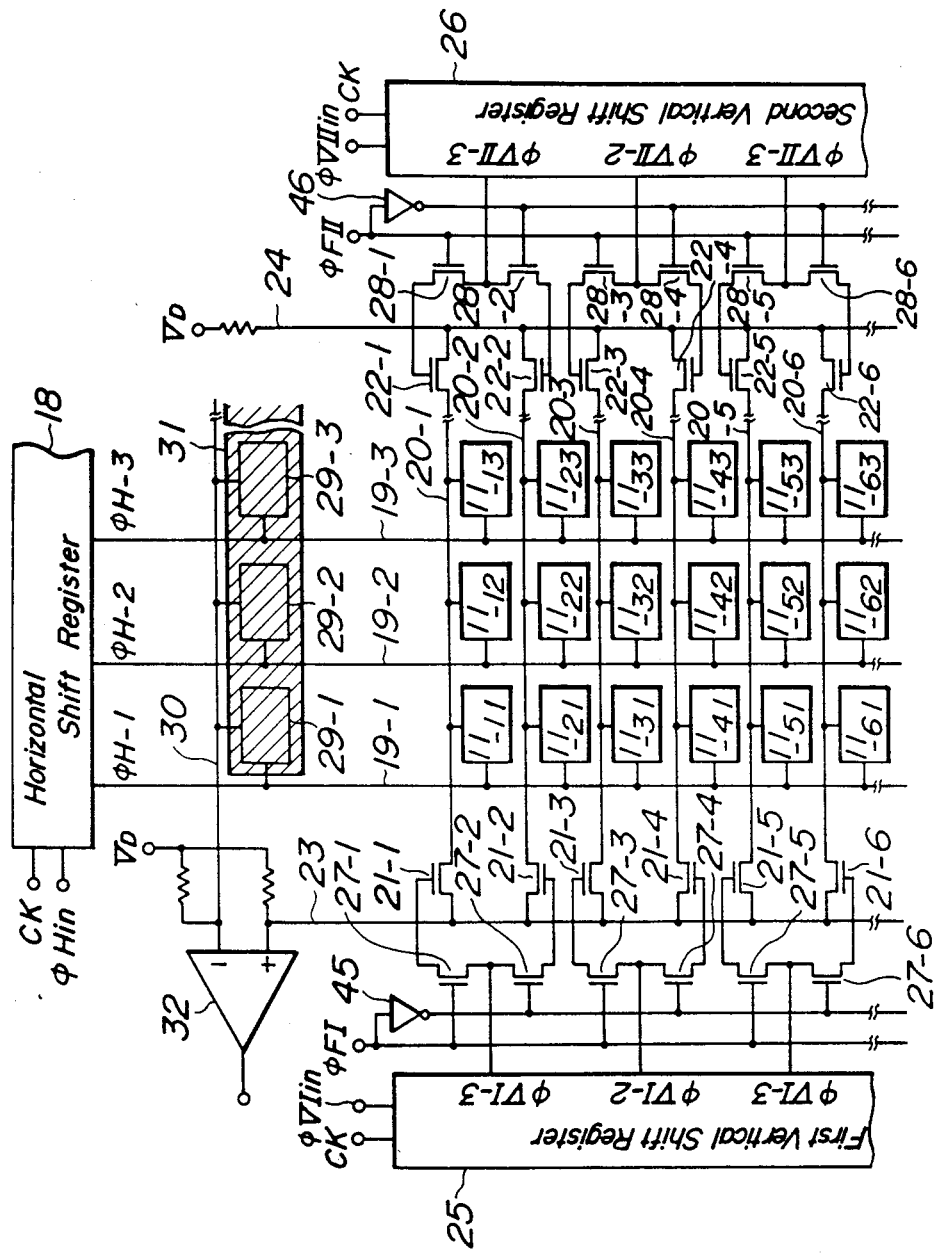
FIG. 6 is a block diagram showing the circuit construction of another embodiment of the solid state image pick-up device according to the invention.

FIG. 6 is a circuit diagram showing an embodiment of the solid state image pick-up device in which an interlace scanning circuit is provided. In FIG. 6, picture elements 11-11, 11-12, 11-13 . . . ; 11-21, 11-22, 11-23 . . . ; 11-31, 11-32, 11-33 . . . each constituted by a MOS transistor and a photodiode like that described in the previous embodiment are arranged in a matrix form and are operated selectively under the control of horizontal scanning lines 19-1, 19-2 . . . and vertical scanning lines 20-1, 20-2 . . . The horizontal scanning lines are connected to outputs of a horizontal shift register 18. The vertical scanning lines are connected to first and second signal read-out lines 23 and 24 through first and second vertical selection switches 21-1, 21-2 . . . and 22-1, 22-2 . . . , respectively. Gates of the first and second vertical selection switches are connected to outputs of first and second vertical shift registers 25 and 26, respectively by means of first and second field selection switches 27-1, 27-2, 27-3 . . . and 28-1, 28-2, 28-3 . . . , respectively, each of the field selection switches being formed by a MOS transistor. As illustrated in FIG. 6, each of the output pulses from the first and second vertical shift registers 25 and 26 are parallelly applied to paired field selection switches 27-1, 27-2; 27-3, 27-4; . . . and 28-1, 28-2; 28-3, 28-4; . . . To gates of the odd numbered first and second field selection switches 27-1, 27-3 . . . and 28-1, 28-3 . . . are supplied first and second field selection pulses $\phi$FI and $\phi$FII, and to the even numbered first the second selection switches 27-2, 27-4 . . . and 28-2, 28-4 . . . are applied inverted first and second field selection pulses $\phi$FI and $\phi$FII via inverters 45 and 46, respectively in synchronism with the line scanning period. The first field selection pulse $\phi$FI assumes a high logical level during an odd field period, and a low logical level during an even field period. The second field selection pulse $\phi$FII also has a high logical level during the odd field period and a low logical level during the even field period, but is delayed with respect to the first field selection pulse φFI by a delay time $t_d$.

In the embodiment shown in FIG. 6, in the odd field period, the field selection switches 27-1, 27-3 . . . ; 28-1, 28-3 . . . corresponding to the odd numbered scanning lines are made on and the vertical scanning pulses φVI and φVII are applied to the vertical scanning lines 20-1, 20-3 . . . In the even field period, the field selection switches 27-2, 27-4 . . . and 28-2, 28-4 . . . are turned on and the vertical scanning pulses φVI and φVII are supplied to the vertical scanning lines 20-2, 20-4 . . . In this manner, it is possible to carry out the interlace scanning corresponding to the standard television system. Also in this embodiment, by suitably setting the delay time $t_d$ between the first vertical scanning pulse φVI and the second vertical scanning pulse φVII as well as between the first and second field selection pulses φFI and φFII, the shutter open period can be adjusted within the very wide range from 63.5 μsec. to 33.3 m sec.

FIGS. 7A to 7H show various pulses for explaining the operation of the solid state image pick-up device illustrated in the FIG. 6 in case of effecting the shutter function. FIG. 7A shows clock pulses ck having a frequency $f_H$ for driving the horizontal shift register 18 and vertical shift registers 25 and 26, FIG. 7B shows a vertical synchronizing pulses φsync, FIGS. 7C and 7G show first and second field selection pulses φFI and φFII, respectively, FIGS. 7D and 7H show input pulses φVI$_{in}$ and φVII$_{in}$ to the first and second vertical shift registers 25 and 26, respectively and FIGS. 7E and 7F depict vertical scanning pulses φVI-1 and φVI-2 generated from the first vertical shift register 25. As shown in the drawing, the signal charge storing period, i.e. the shutter open time $t_i$ can be expressed by $t_i=2V-t_d$, wherein 2V is two field period, i.e. one frame period and $t_d$ is the delay time of the second field selection pulse φFII with respect to the first field selection pulse φFI and equals to a delay time of the second vertical shift register input pulse φVII$_{in}$ relative to the first vertical shift register input pulse φVI$_{in}$.

In FIG. 6, the image pick-up device further comprises dummy cells 29-1, 29-2, 29-3 . . . each of which is composed of a MOS transistor and a photodiode just like that in the picture element and is shielded by a light shielding layer 31. Drains of the dummy cells are connected to a noise read-out line 30 which is connected to a negative input of a differential amplifier 32 whose positive input is connected to the first signal charge read-out line 23. In this manner, from the differential amplifier 32 is derived an output image signal having spike noise due to the clock pulses removed therefrom. In the embodiment illustrated in FIG. 2, since the horizontal scanning pulses φH are applied to the gates of the MOS transistors forming the picture elements, there may be produced rather large spike noise as compared with the known device shown in FIG. 1 in which the vertical scanning pulses φV are applied to the gates. However, in the present embodiment, this spike noise can be materially reduced to an admissible level by means of the noise cancel circuit using the dummy cells.

It should be noted that in the above explained embodiments of the image pick-up device according to the invention, since the signal charge stored in the photodiode must be read-out during a time period in which the horizontal scanning pulses φH is in the high logical level (generally, this time period is in the order of 70 n sec.), it is necessary to decrease a resistance of MOS transistor in the turn-on condition and thus, an area of MOS transistor becomes somewhat larger than the known device. However, since each picture element can be formed by a single transistor, the whole device is still sufficiently small.

Now, the vertical enhancement function will be explained with reference to FIGS. 8A to 8I. FIG. 8A show the vertical synchronizing pulse φsync, FIGS. 8B and 8F show first and second field selection pulses φFI and φFII, respectively, FIGS. 8C and 8G show input pulses φVI$_{in}$ and φVII$_{in}$ supplied to the first and second field selection circuits, respectively, and FIGS. 8D and 8E denote vertical scanning pulses φVI-1, φVI-2 and φVII-1, φVII-2 generated from the first and second vertical shift registers, respectively. In the case of effecting the vertical contour enhancement, the shutter speed, i.e. the phase difference $t_i$ between the first and second field selection pulses φFI and φFII is set to the field period V. That is to say, the shutter open time is equal to 1/60 second. As shown in FIGS. 8B and 8F, the first and second field selection pulses φFI and φFII are in opposite phase so that when the lines belonging to the odd field are successively scanned to derive the image signal on the line 23, the lines belonging to the even field are successively scanned to derive the image signal on the line 24. In this case, the vertical scanning pulses φVI-1, φVI-2, . . . generated from the first vertical shift register 26 are synchronized with the vertical scanning pulses φVII-1, φVII-2, . . . supplied from the second vertical shift register 26 and therefore, the image signals simultaneously derived on the lines 23 and 24 correspond to adjacent picture elements in the vertical direction. Therefore, by processing the image signals simultaneously derived on the lines 23 and 24 by the circuitry shown in FIG. 3, the vertical enhancement can be performed. In the present embodiment, since each picture element is read-out twice during each frame at the equal time period, i.e. the field period, the image signals simultaneously read-out on the lines 23 and 24 have the same gain and thus the vertical enhancement can be effected very precisely. In this connection, it should be noted that the vertical enhancement is carried out by means of directly adjacent picture elements in the vertical direction.

As explained above in detail, according to the invention, since, in the conventional MOS transistor of XY address type, the signal charge stored in the photodiode can be read out twice during one field period by arranging two read-out lines for reading out the signal charge, it is possible to utilize selectively the shutter function and the contour enhancement function in the vertical direction. Moreover, since the solid state image pick-up device according to the invention can be manufactured by the same process as that for manufacturing the conventional solid state image pick-up device of MOS type, it is possible to make the solid state image pick-up device having the shutter and contour enhancement functions for the same manufacturing costs as that of the conventional one. Further, according to the invention, since it is not necessary to use the delay circuit or memory for effecting the contour enhancement in the vertical direction, the contour enhancing operation can be attained in an extremely simple and inexpensive manner.

What is claimed is:

1. A solid state image pick-up device comprising
    means having a number of picture elements arranged in a matrix form, each picture element including at least one MOS transistor and a photodiode;

horizontal scanning means connected to said picture elements for scanning horizontally the picture elements at a given horizontal scanning period;

vertical scanning means connected to said picture elements for scanning the picture elements at a given vertical scanning period;

signal reading-out means including first and second signal read-out lines selectively connected to the picture elements under the control of said horizontal and vertical scanning means in such a manner that signal charges stored in the photodiodes are read-out twice within a frame period to perform a shutter function having a variable shutter open time;

contour enhancing means for enhancing a contour of an image in a vertical direction by reading-out signal charges stored in two vertically adjacent photodiodes simultaneously, while said shutter open time is fixed to the frame period, to effect a contour enhancement function; and selection means for selecting one of said shutter function and contour enhancement function at will.

2. A device according to claim 1, wherein said horizontal scanning means comprises a plurality of horizontal scanning lines, each commonly connected to picture elements arranged in a vertical direction, and at least one horizontal shift register having outputs connected to said horizontal scanning lines for driving the horizontal scanning lines successively with horizontal scanning pulses; and said vertical scanning means comprises a plurality of vertical scanning lines, each commonly connected to picture elements arranged in a horizontal direction, and first and second vertical shift registers having outputs connected to said vertical scanning lines for driving the vertical scanning lines with first and second vertical scanning pulses, respectively, said second vertical scanning pulses being delayed with respect to the first vertical scanning pulses by a given time period.

3. A device according to claim 2, wherein said vertical scanning means further comprises first vertical selection switches connected between the vertical scanning lines and the first signal read-out line and second vertical selection switches connected between the vertical scanning lines and the second signal read-out line, and said first and second vertical selection switches being driven by said first and second vertical scanning pulses, respectively.

4. A device according to claim 3, wherein each of said first and second vertical selection switches is formed by a MOS transistor.

5. A device according to claim 3, wherein said horizontal scanning lines are connected to gates of the MOS transistors of the picture elements and said vertical scanning lines are connected to drains of the MOS transistors of the picture elements.

6. A device according to claim 3, wherein said vertical scanning means further comprises first field selection switches connected to the first vertical selection switches, successive two first field selection switches being connected to respective outputs of said first vertical shift register, and second field selection switches connected to the second vertical selection switches, successive two second field selection switches being connected to respective outputs of said second vertical shift register;

every other first field selection switches being driven alternately for an odd field by first field selection pulses; and every other second field selection switches being driven alternately for an even field by second field selection pulses which are delayed with respect to the first field selection pulses by said given time period.

7. A device according to claim 2, wherein
each of the picture elements comprises first and second MOS transistors and a photodiode;
said horizontal scanning means comprises
first horizontal scanning lines connected to drains of the first MOS transistor,
second horizontal scanning lines connected to drains of the second MOS transistors,
first horizontal selection switches connected between the first horizontal scanning lines and first signal read-out line,
second horizontal selection switches connected between the second horizontal scanning lines and second signal read-out line,
a first horizontal shift register having outputs connected to the first horizontal selection switches, and
a second horizontal shift register having outputs connected to the second horizontal selection switches; and
said vertical scanning means comprises
first vertical scanning lines connected to gates of the first MOS transistors,
second vertical scanning lines connected to gates of the second MOS transistors,
a first vertical shift register connected to said first vertical scanning lines, and
a second vertical shift register connected to said second vertical scanning lines.

8. A device according to claim 7, wherein each of said selection switches is formed by a MOS transistor.

9. A device according to claim 2, wherein
each of the picture elements comprises first and second MOS transistors and a photodiode;
said horizontal scanning lines being commonly connected to drains of the first MOS transistors of respective picture elements and to drains of the second MOS transistors of horizontally adjacent picture elements;
said vertical scanning lines being commonly connected to gates of the first MOS transistors of respective picture elements and to gates of the second MOS transistors of vertically adjacent picture elements; and
said horizontal scanning means further comprises first and second horizontal selection switches connected between the respective horizontal scanning lines and the first and second signal read-out lines, respectively, said first and second horizontal selection switches being driven by the horizontal scanning pulses.

10. A device according to claim 1, further comprising a noise cancel circuit including:
dummy cells each having the same construction as that of the picture element, said dummy cells being driven by said horizontal scanning means to produce noise components,
a noise component read-out line connected to the dummy cells, and a differential amplifier having one input connected to said noise component read-out line and another input connected to one of said first and second signal read-out line.

11. A device according to claim 1, wherein said contour enhancing means comprises:

first calculation means including a first input terminal connected to said first signal read-out line and a second input terminal connected to said second signal read-out line, and deriving a difference between image signals simultaneously generated on said first and second signal read-out line; and second calculation means including a first input terminal connected to said first signal read-out line and a second input terminal connected to an output terminal of said first calculation means and adding said difference to the image signal supplied on the first input terminal.

12. A device according to claim 11, wherein said first calculation means is formed by a differential amplifier.

13. A device according to claim 12, wherein said selection means comprises a switch connected between the output of the differential amplifier and the second input terminal of the second calculation means.

* * * * *